US012589304B2

(12) United States Patent
Zhang

(10) Patent No.: US 12,589,304 B2
(45) Date of Patent: Mar. 31, 2026

(54) METHOD AND AR GLASSES FOR AR GLASSES INTERACTIVE DISPLAY

(71) Applicant: Beijing Xiaomi Mobile Software Co., Ltd., Beijing (CN)

(72) Inventor: Zhengtao Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 404 days.

(21) Appl. No.: 18/308,058

(22) Filed: Apr. 27, 2023

(65) Prior Publication Data

US 2024/0198226 A1 Jun. 20, 2024

(30) Foreign Application Priority Data

Dec. 14, 2022 (CN) .......................... 202211611113.6

(51) Int. Cl.
| | |
|---|---|
| *A63F 13/537* | (2014.01) |
| *A63F 13/26* | (2014.01) |
| *G06T 7/70* | (2017.01) |
| *G06T 13/20* | (2011.01) |
| *G06V 20/20* | (2022.01) |

(52) U.S. Cl.
CPC ............ *A63F 13/537* (2014.09); *A63F 13/26* (2014.09); *G06T 7/70* (2017.01); *G06T 13/20* (2013.01); *G06V 20/20* (2022.01); *A63F 2300/8082* (2013.01); *G06T 2200/24* (2013.01)

(58) Field of Classification Search
CPC ................... A63F 13/537; A63F 13/26; A63F 2300/8082; A63F 13/211; A63F 13/212;
A63F 13/25; A63F 13/428; A63F 13/5255; A63F 13/655; G06T 7/70; G06T 13/20; G06T 2200/24; G06T 19/006; G06V 20/20; G06F 3/011
See application file for complete search history.

(56) References Cited

U.S. PATENT DOCUMENTS

| | | | |
|---|---|---|---|
| 2018/0157398 A1 | 6/2018 | Kaehler et al. | |
| 2023/0038709 A1* | 2/2023 | Ramani ................... | G06F 3/017 |
| 2023/0319221 A1* | 10/2023 | Doken ...................... | G06T 7/12 |

OTHER PUBLICATIONS

Extended European Search Report issued on Feb. 5, 2024 for European Patent Application No. 23170605.2.
Anonymous, "What is USDZ and why you should care—Apple's AR kit explained", Internet Article, Vectary.com, (2021).
(Continued)

*Primary Examiner* — Peter J Iannuzzi
(74) *Attorney, Agent, or Firm* — Volpe Koenig

(57) ABSTRACT

A method for AR glasses interactive display. includes: generating first projection data by performing rendering by a terminal device according to first pose information of a target object relative to a user wearing AR glasses and pre-stored model data of the target object, sending the first projection data to the AR glasses, and projecting and displaying a first virtual animation on a screen of the AR glasses by the AR glasses according to the received first projection data, the first virtual animation including a first virtual object corresponding to the target object and an opening animation of the first virtual object, where an initial pose of the first virtual object, projected and displayed in a virtual space after the opening animation, relative to the user is related to the first pose information.

14 Claims, 4 Drawing Sheets

(56) References Cited

OTHER PUBLICATIONS

Anonymous, "Configuring Plane Detection for AR Foundation", Unity Technologies, (2020).

Sri, W. Y., "Building Augmented Reality Applications with Hand Tracking", Internet Article, (2022).

"Augmented reality," Article, Wikipedia, https://en.wikipedia.org/wiki/Augmented_reality (2022).

Extended European Search Report issued on Sep. 27, 2023 for European Patent Application No. 23170605.2.

* cited by examiner

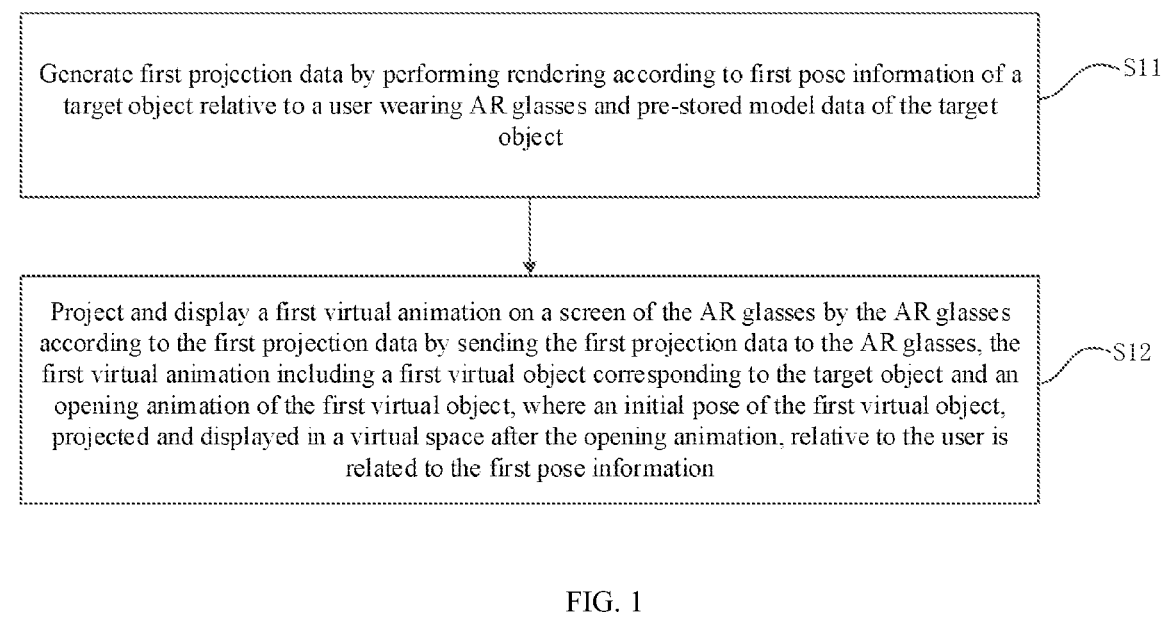

Generate first projection data by performing rendering according to first pose information of a target object relative to a user wearing AR glasses and pre-stored model data of the target object    S11

Project and display a first virtual animation on a screen of the AR glasses by the AR glasses according to the first projection data by sending the first projection data to the AR glasses, the first virtual animation including a first virtual object corresponding to the target object and an opening animation of the first virtual object, where an initial pose of the first virtual object, projected and displayed in a virtual space after the opening animation, relative to the user is related to the first pose information    S12

FIG. 1

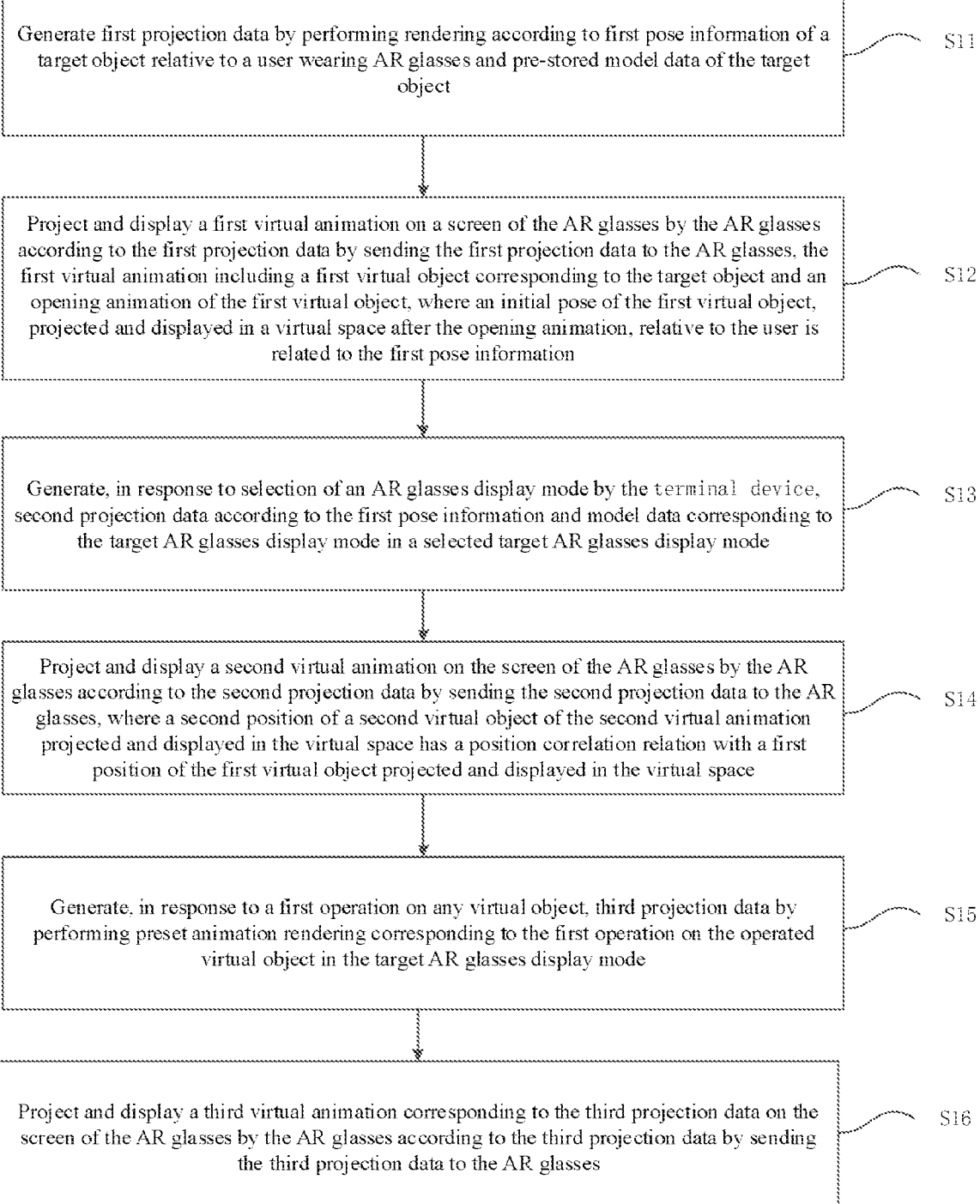

Generate first projection data by performing rendering according to first pose information of a target object relative to a user wearing AR glasses and pre-stored model data of the target object     S11

Project and display a first virtual animation on a screen of the AR glasses by the AR glasses according to the first projection data by sending the first projection data to the AR glasses, the first virtual animation including a first virtual object corresponding to the target object and an opening animation of the first virtual object, where an initial pose of the first virtual object, projected and displayed in a virtual space after the opening animation, relative to the user is related to the first pose information     S12

Generate, in response to selection of an AR glasses display mode by the terminal device, second projection data according to the first pose information and model data corresponding to the target AR glasses display mode in a selected target AR glasses display mode     S13

Project and display a second virtual animation on the screen of the AR glasses by the AR glasses according to the second projection data by sending the second projection data to the AR glasses, where a second position of a second virtual object of the second virtual animation projected and displayed in the virtual space has a position correlation relation with a first position of the first virtual object projected and displayed in the virtual space     S14

Generate, in response to a first operation on any virtual object, third projection data by performing preset animation rendering corresponding to the first operation on the operated virtual object in the target AR glasses display mode     S15

Project and display a third virtual animation corresponding to the third projection data on the screen of the AR glasses by the AR glasses according to the third projection data by sending the third projection data to the AR glasses     S16

FIG. 2

Receive first projection data sent from the terminal device, where the first projection data is generated according to first pose information of a target object relative to a user wearing the AR glasses and pre-stored model data of the target object — S31

Project and display a first virtual animation on a screen of the AR glasses according to the first projection data, the first virtual animation including a first virtual object corresponding to the target object and an opening animation of the first virtual object, where an initial pose of the first virtual object, projected and displayed in a virtual space after the opening animation, relative to the user is related to the first pose information — S32

FIG. 3

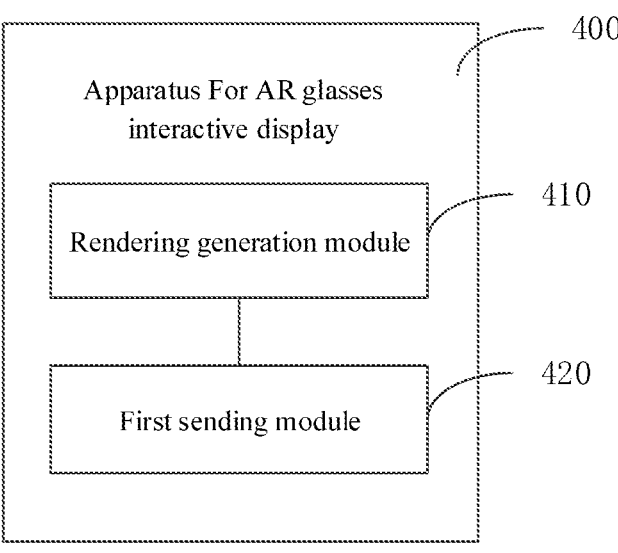

Apparatus For AR glasses interactive display — 400

Rendering generation module — 410

First sending module — 420

FIG. 4

METHOD AND AR GLASSES FOR AR GLASSES INTERACTIVE DISPLAY

CROSS-REFERENCE TO RELATED APPLICATION

The disclosure claims priority to Chinese patent application No. 202211611113.6, filed on Dec. 14, 2022, to the China Patent Office, and entitled "method, apparatus, device, and storage medium for AR glasses interactive display", the entire content of which is incorporated herein by reference.

BACKGROUND

With the aid of augmented reality (AR) glasses, a pose of an object in a collected image can be computed in real time, and then a virtual world can be displayed over the real world through micro-projection on a screen of the AR glasses. In most cases, head gaze and gesture interaction function as glasses input to a pair of AR glasses, then achieves projection through the AR glasses.

SUMMARY

In order to solve the problems existing in the related art, the disclosure provides a method and AR glasses for an AR glasses interactive display.

According to a first aspect of examples of the disclosure, provided is a method for an AR glasses interactive display, performed by a terminal device, where the terminal device is in communication with AR glasses, and the method includes: generating first projection data by performing rendering according to first pose information of a target object relative to a user wearing AR glasses and pre-stored model data of the target object; and projecting and displaying a first virtual animation on a screen of the AR glasses by the AR glasses according to the first projection data by sending the first projection data to the AR glasses, the first virtual animation including a first virtual object corresponding to the target object and an opening animation of the first virtual object, where an initial pose of the first virtual object, projected and displayed in a virtual space after the opening animation, relative to the user is related to the first pose information.

According to a second aspect of examples of the disclosure, provided is a method for an AR glasses interactive display, performed by AR glasses, where the AR glasses are in communication with a terminal device, and the method includes: receiving first projection data sent from the terminal device, where the first projection data is generated according to first pose information of a target object relative to a user wearing the AR glasses and pre-stored model data of the target object; and projecting and displaying a first virtual animation on a screen of the AR glasses according to the first projection data, the first virtual animation including a first virtual object corresponding to the target object and an opening animation of the first virtual object, where an initial pose of the first virtual object, projected and displayed in a virtual space after the opening animation, relative to the user is related to the first pose information.

According to a third aspect of examples of the disclosure, provided is an AR glasses, where the AR glasses are in communication connection with a terminal device, and the method includes: a processor and a memory for storing executable instructions capable of running on the processor, where the processor is configured to: receive first projection data sent from the terminal device, where the first projection data is generated according to first pose information of a target object relative to a user wearing the AR glasses and pre-stored model data of the target object; and project and display a first virtual animation on a screen of the AR glasses according to the first projection data, the first virtual animation comprising a first virtual object corresponding to the target object and an opening animation of the first virtual object, where an initial pose of the first virtual object, projected and displayed in a virtual space after the opening animation, relative to the user is related to the first pose information.

It is to be understood that both the foregoing general description and the following detailed description are illustrative and explanatory and are not restrictive of the disclosure.

BRIEF DESCRIPTION OF THE DRAWINGS

The accompanying drawings are incorporated in the description as a constituent part of the description, illustrate examples conforming to the disclosure, and serve to explain the principles of the disclosure together with the specification.

FIG. 1 is a flowchart of a method for an augmented reality (AR) glasses interactive display on a terminal device side according to an example.

FIG. 2 is a flowchart of another method for an AR glasses interactive display on a terminal device side according to an example.

FIG. 3 is a flowchart of another method for an AR glasses interactive display on an AR glasses side according to an example.

FIG. 4 is a block diagram of an apparatus for an AR glasses interactive display on a terminal device side according to an example.

DETAILED DESCRIPTION

Figure 5:
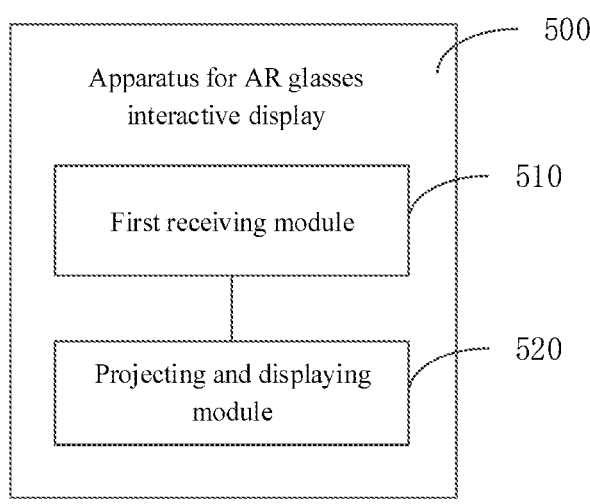
FIG. 5 is a block diagram of an apparatus for an AR glasses interactive display on an AR glasses side according to an example.

Description will be made in detail to examples, instances of which are illustrated in the accompanying drawings. When the following description relates to the accompanying drawings, the same numbers in different accompanying drawings refer to the same or similar elements unless otherwise indicated. The implementation modes described in the following examples do not represent all implementation modes consistent with the disclosure. Rather, they are merely instances of apparatuses and methods consistent with some aspects of the disclosure as detailed in the appended claims.

It is to be noted that in the present application, all the actions of obtaining a signal, information, or data are performed under the premise of complying with corresponding data protection laws and regulations of the country where they are located and obtaining the authorization given by an owner of a corresponding apparatus.

The disclosure relates to the technical field of augmented reality (AR) glasses. In the related technology, head gaze and gesture interaction function as glasses input to AR glasses, then achieves projection through the AR glasses in the related technology, thus resulting in a single input mode and a single interaction mode of the AR glasses.

In view of this, the present disclosure provides a method and AR glasses for an AR glasses interactive display.

FIG. 1 is a flowchart of a method for an augmented reality (AR) glasses interactive display on a terminal device side according to an example. The method is performed by a terminal device, and the terminal device is in communication with AR glasses. It can be noted that the terminal device in the disclosure may be a mobile terminal, for instance, a smartphone, a tablet computer, a smart watch in wearable devices, etc., and may also be a personal computer, for instance, a notebook computer, a desktop computer, etc. Furthermore, the communication connection may be wireless communication, for instance, Bluetooth connection and WiFi connection, and may also be a wired connection. As shown in FIG. 1, the method includes the following steps.

In step S11, first projection data is generated by performing rendering according to first pose information of a target object relative to a user wearing AR glasses and pre-stored model data of the target object.

In the example of the disclosure, the first pose information of the target object relative to the user wearing the AR glasses may be manually input to the terminal device by the user, may be sent to the terminal device by an electronic device that displays the target object, or may be sent by the AR glasses in the disclosure.

The target object may be in the form of a picture to be pasted at an arbitrary position, or in the form of a picture or a video to be displayed on an electronic device, or may be an item existing in a real space, for instance, a doll placed on a desktop or a PVC figure placed on the ground.

In the example of the disclosure, a plurality of model data may be pre-stored in the terminal device, and each of the model data has a corresponding relation with an object. Thus, the pre-stored model data corresponding to the target object may be called according to the corresponding relation, and then rendering is performed according to the called model data at a position represented by the first pose information of the target object, so as to generate a first virtual object including the corresponding target object and an opening animation of the first virtual object.

In step S12, the AR glasses project and display a first virtual animation on a screen of the AR glasses according to the first projection data by sending the first projection data to the AR glasses, the first virtual animation including a first virtual object corresponding to the target object and an opening animation of the first virtual object, where an initial pose of the first virtual object, projected and displayed in a virtual space after the opening animation, relative to the user is related to the first pose information.

In the example of the disclosure, when receiving the first projection data, the AR glasses project and display the first virtual animation corresponding to the first projection data on the screen of the AR glasses by means of a micro projector of the AR glasses.

In the example of the disclosure, the opening animation may take a plane of the target object in the real space as a reference plane, to construct a mapping plane coinciding with the reference plane in the virtual space. It can be understood that the virtual space is a space that can be seen after the user wears the AR glasses, and the mapping plane is a plane that can also be seen when the user wears the AR glasses. The mapping plane seen by the user in the virtual space coinciding with the reference plane in the real space, and then a transfer gate is constructed on the mapping plane, where the transfer gate may be displayed in a shape of the target object, so as to open the transfer gate from the middle, and the first virtual object jumps out of the open transfer gate.

Illustratively, when the target object is an image displayed on an electronic device, a plane of a real space where a screen of the electronic device is located may be taken as a reference plane, a mapping plane in the virtual space may be constructed at a position corresponding to the reference plane in the virtual space, and a transfer gate may be constructed in a screen shape of the electronic device. In this way, the user sees that the first virtual object jumps out of the electronic apparatus while wearing the AR glasses.

Further, as for relationship between the initial pose and the first pose information, in the example of the disclosure, a first distance between the first virtual object and the user wearing the AR glasses in the virtual space is related to a second distance between the target object and the user wearing the AR glasses in the real space, and in particular, the first virtual object seen by the user wearing the AR glasses is displayed at or beside the position where the target object is located. Since the target object may be a two-dimensional image and the first virtual object is a three-dimensional (3D) object, the position of the first virtual object in the virtual space does not completely coincide with the position of the target object in the real space, especially when the image is parallel to the ground or not perpendicular to the ground.

In the above technical solution, first projection data is generated by performing rendering by the terminal device according to first pose information of a target object relative to a user wearing AR glasses and pre-stored model data of the target object, the first projection data is sent to the AR glasses, and a first virtual animation is projected and displayed on a screen of the AR glasses by the AR glasses according to the received first projection data, the first virtual animation including a first virtual object corresponding to the target object and an opening animation of the first virtual object, where an initial pose of the first virtual object, projected and displayed in a virtual space after the opening animation, relative to the user is related to the first pose information. In this way, by sending the projection data from the terminal device, an input mode of the AR glasses may be increased, an interaction mode of the AR glasses may be enriched, and thus an application scene of the AR glasses may be increased.

Alternatively, as shown in FIG. 2, the method according to the example of the disclosure includes steps S11 and S12, as previously described with reference to FIG. 1, and steps S13-S16.

In step S13, second projection data is generated in response to the selection of an AR glasses display mode by the terminal device according to the first pose information and model data corresponding to the target AR glasses display mode in a selected target AR glasses display mode.

In the example of the disclosure, after the terminal device sends the first projection data, an AR glasses display mode may be displayed on the screen of the terminal device, for instance, a plurality of AR glasses display modes are displayed in the form of a list. The user can select the target AR glasses display mode on the screen of the terminal device.

The terminal device may pre-store one or more of the model data for each of the AR glasses display modes. In response to determining that one model data is pre-stored in the AR glasses display mode, the model data is directly called to generate a second virtual object by performing rendering at a position represented by the first pose information. In response to determining that a plurality of model data is pre-stored in the AR glasses display mode, a name or profile of each model data may be displayed, and then the model data selected by the user is called to generate a second virtual object by performing rendering at the position represented by the first pose information.

In step S14, the AR glasses project and display a second virtual animation on the screen of the AR glasses according to the second projection data by sending the second projection data to the AR glasses, where a second position of a second virtual object of the second virtual animation projected and displayed in the virtual space has a position correlation relation with a first position of the first virtual object projected and displayed in the virtual space.

In the example of the disclosure, the AR glasses may generate feedback information after projecting and displaying the first virtual object, and then send the feedback information to the terminal device. The terminal device sends the second projection data to the AR glasses after receiving the feedback information.

In the example of the disclosure, when receiving the second projection data, the AR glasses project and display a third virtual animation corresponding to the second projection data on the screen of the AR glasses by means of the micro projector of the AR glasses again. In this case, the first virtual object projected according to the first projection data still continues to be projected and displayed.

In step S15, third projection data is generated in response to a first operation on any virtual object by performing preset animation rendering corresponding to the first operation on the operated virtual object in the target AR glasses display mode.

In the example of the disclosure, the first operation on any virtual object may be the first operation on the first virtual object, and may also be the first operation on the second virtual object. The first operation may be moving, rotating, color changing, image switching, etc., of the virtual object. It is to be noted that when the first projection data is generated, the terminal device has a first virtual object that is rendered in the color and image of the target object, and after the projection is completed, the color and image may be changed according to the first operation by the user.

The first operation may be an operation on the virtual object by the user in a virtual space, and may also be an operation on the virtual object by the user on the terminal device. Moreover, the first operation may be an operation on the virtual object by a user currently wearing the AR glasses in communication connection with the terminal device, and may also be an operation on the virtual object by a user not wearing the AR glasses.

With the first operation being an operation on the virtual object by the user in the virtual space as an instance, the user noting wearing the AR glasses cannot see the first virtual object and the second virtual object, but the user wearing the AR glasses can tell the user not wearing the AR glasses a pose relation between the first virtual object and the target object, or a pose relation between the second virtual object and the target object, and then the user not wearing the AR glasses can operate the first virtual object or the second virtual object according to the position of the target object.

In the example of the disclosure, an operation motion of the user on the virtual object within a range of visibility is collected in real-time by the AR glasses, and the operation motion is identified. When it is identified that a first operation satisfying pre-stored operation motions is present in the operation motions, the first operation is sent to the terminal device, and the terminal device performs animation rendering according to a preset animation corresponding to the first operation. It can be noted that each pre-stored operation motion has corresponding preset animation data in the terminal device. The terminal device calls the corresponding preset animation data to perform animation rendering according to the first operation.

In step S16, the AR glasses project and display a third virtual animation corresponding to the third projection data on the screen of the AR glasses according to the third projection data by sending the third projection data to the AR glasses.

In the example of the disclosure, when receiving the third projection data, the AR glasses project and display the third virtual animation corresponding to the third projection data on the screen of the AR glasses by means of the micro projector of the AR glasses again. In this case, the first virtual object projected according to the first projection data or the second virtual object projected according to the second projection data still continues to be projected and displayed, such that a corresponding virtual animation display can be performed on the virtual object.

Alternatively, the AR glasses display mode includes at least one of a household appliance linkage display mode, a game display mode, and a model display mode.

In the example of the disclosure, a household appliance may be, for instance, a lamp, a television, etc., and the household appliance may likewise be in communication connection with the terminal device by means of WiFi or other communication modes. A game may be a pre-stored game on the terminal device, and a model is also pre-stored on the terminal device.

Alternatively, step S13, in which second projection data is generated in response to selection of an AR glasses display mode by the terminal device according to the first pose information and model data corresponding to the target AR glasses display mode in a selected target AR glasses display mode, includes: a target household appliance currently in communication connection with the terminal device is determined in response to determining that the selected target AR glasses display mode is the household appliance linkage display mode.

In the example of the disclosure, one or more household appliances may be in communication with the terminal device. In response to determining that one household appliance is in communication with the terminal device, the household appliance is directly determined as a target household appliance. In response to determining that a plurality of household appliances are in communication connection with the terminal device, names of the household appliances and pose information of the household appliances relative to the target object may be displayed, and one or more household appliances may be determined as the target household appliances according to selection by the user.

In an embodiment, when the plurality of household appliances are the same type of devices, for instance, the plurality of household appliances are all desk lamps, all of the household appliances may be directly determined as the target household appliances.

In an example, the AR glasses collect an image of a household appliance within a field of view by means of a configured camera, match the image with a pre-stored device image, and determine second pose information of the target household appliance relative to the user wearing the AR glasses in response to determining that a matching result represents the presence of the target household appliance matching the pre-stored device image in the images. Then the second pose information is sent to the terminal device.

The second projection data is generated according to the second pose information of the target household appliance relative to the user wearing the AR glasses, model data corresponding to the target household appliance, and state information of the target household appliance, where the second virtual animation of the second projection data takes the target household appliance as the second virtual object.

In the example of the disclosure, each household appliance has a corresponding pre-stored model data in the terminal device. The model data is used for constructing a second virtual object having the same appearance as the household appliance. The state information of the target household appliance may be an operational state of the household appliance, for instance, an off state or an on state.

Alternatively, step S15, in which the third projection data is generated in response to a first operation on any virtual object by performing preset animation rendering corresponding to the first operation on the operated virtual object in the target AR glasses display mode, includes: a preset control operation on the second virtual object is determined in response to the first operation on any virtual object according to the state information in the household appliance linkage display mode.

In the example of the disclosure, the first operation on any virtual object may refer to an operation for completing second virtual object projecting and displaying of the AR glasses, and may also be an operation performed by the user in the target household appliance.

A preset control operation on the second virtual object is related to the state information of the target household appliance. With the target household appliance being a desk lamp as an instance, when state information of the desk lamp represents that the desk lamp is in an off state, that is, at this moment, the desk lamp does not emit light, and a preset control operation on the second virtual object is turning on the desk lamp, that is, switching the desk lamp to emit light. When the state information of the desk lamp represents that the desk lamp is in an on state, that is, at this moment, the desk lamp emits light, and the preset control operation on the second virtual object is turning off the desk lamp, that is, switching the desk lamp to emit no light.

An animation path of the first virtual object is determined according to the first pose information and the second pose information.

In the example of the disclosure, the animation path of the first virtual object refers to a path of the first virtual object to the second virtual object. Accordingly, an animation of the first virtual object going to the second virtual object that the user wearing AR glasses can see in the virtual space may be determined according to the first pose information and the second pose information of the target household appliance relative to the target object.

The third projection data is generated according to the animation path, where the third virtual animation of the third projection data shows that the first virtual object travels along the animation path to the position of the second virtual object in the virtual space, and executes the preset control operation on the second virtual object.

Illustratively, in response to determining that the first virtual object is a red cartoon figure, the cartoon figure flies towards the desk lamp along the animation path. In response to determining that the desk lamp is in the off state at this moment, the cartoon figure reaches the position of the second virtual object in the virtual space, and presses on the second virtual object, and in this case, the AR glasses may switch the second virtual object on through projecting and displaying, and project and display a virtual light effect in the virtual space. In response to determining that the desk lamp is in the on state at this moment, the cartoon figure reaches the position of the second virtual object in the virtual space, and presses off the second virtual object, and in this case, the AR glasses may switch the second virtual object off through projecting and displaying, and project and display an effect without virtual light in the virtual space.

In an embodiment, the color of the first virtual object may be switched in the virtual space according to the virtual light effect, to simulate a lighting effect of light on an object.

Alternatively, the method according to the example of the disclosure includes a control instruction aimed at the target household appliance is generated according to the preset control operation corresponding to the state information.

According to digital twin technology, the terminal device may generate a control instruction for switching the state of the target household appliance according to the preset control operation corresponding to the state information of the household appliance. Thus, not only can the virtual light effect be simulated in the virtual space, but also the switch of the target household appliance can be controlled in twins.

The target household appliance synchronously executes the preset control operation by sending the control instruction to the target household appliance.

The above example continues to be used for description. When the cartoon figure presses on the second virtual object, the desk lamp is switched on according to an on control instruction received from the terminal device in the actual space.

Alternatively, the method according to the example of the disclosure includes a twin instruction sent from the target household appliance is received, where the twin instruction is generated by the target household appliance in response to the control operation on the target household appliance.

In the example of the disclosure, the user may perform the control operation on the target household appliance, for instance, a target household appliance originally turned on is turned off by the user, and then the target household appliance generates a twin instruction carrying that the target household appliance is switched off, and sends the twin instruction to the terminal device.

A target control operation is determined from the preset control operation according to the twin instruction.

In the example of the disclosure, the twin instruction is used for representing a state of the target household appliance after switching, and the terminal device may determine the target control operation from the preset control operations according to the state. Illustratively, in response to determining that the twin instruction represents switching the desk lamp off and the current third projection data represents that the second virtual object has been turned off, maintaining the off state is determined as the target control operation from the preset control operation.

Fifth projection data is generated according to the target control operation.

The AR glasses project and display the control operation executed by the first virtual object on the second virtual object on the screen of the AR glasses according to the fifth projection data by sending the fifth projection data to the AR glasses.

Based on the digital twin technology, the example of the disclosure can not only control the household appliance by means of the terminal device and project and display the same virtual effect as the state of the apparatus by means of the AR glasses, but also perform twin control over the state of the household appliance projected and displayed by means of the AR glasses according to the control operation on the household appliance.

Alternatively, step S13, in which the second projection data is generated in response to the selection of an AR glasses display mode by the terminal device according to the first pose information and model data corresponding to the target AR glasses display mode in a selected target AR glasses display mode, includes: a game operation interface is displayed on a screen of the terminal device in response to determining that the target AR glasses display mode is the game display mode.

In the example of the disclosure, the terminal device may be arranged at any position, as long as the terminal device establishes a communication connection with the AR glasses. For instance, the terminal device may be arranged in a drawer or a pocket of a user's worn clothing. Furthermore, when the user picks up the terminal device, a target AR glasses display mode may be determined to be the game display mode.

Illustratively, with the terminal device being a smart phone as an example, in a landscape mode of the smart phone, a game operation interface may display a rocker controlling movement of the first virtual object on a left side of a screen, and display operation buttons controlling jump, acceleration, attack and event triggering of the first virtual object on a right side of the screen.

Corresponding game virtual objects are rendered in different virtual planes according to the first pose information and model data corresponding to the game display mode, where the virtual planes correspond one-to-one to real planes in a real space.

In the example of the disclosure, the game display modes may correspond to different games, and each game pre-stores corresponding model data. The model data is used for rendering a game scene corresponding to the game, for instance, the first virtual object may be taken as a target object operated by the user in the game scene, and a chest, a monster, a house, a bridge, etc., in the game may be taken as second virtual objects. In this example, the model data corresponding to the game is used for rendering the second virtual objects of the chest, monster, house, bridge, etc.

Different second virtual objects may be located on different virtual planes, and each virtual plane is constructed according to a plane in a real space within the field of view of the current AR glasses. For instance, a monster is rendered on a first virtual plane, a house is rendered on a second virtual plane, and a bridge is rendered between the first virtual plane and the second virtual plane.

The second projection data is generated according to the game virtual objects corresponding to the different virtual planes.

In the example of the disclosure, the game virtual object is taken as a second virtual object, and then the game virtual object may be projected and displayed in a virtual plane corresponding to a plane in the real space. For instance, a virtual chest and a monster are projected and displayed on a desktop in the real space, and the user can control the first virtual object to defeat the monster and open the chest by means of the operation buttons on the terminal device.

Alternatively, before the step in which the corresponding game virtual objects are rendered in different virtual planes according to the first pose information and model data corresponding to the game display mode, the method includes:

a plane detection result sent from the AR glasses is received, where the plane detection result includes a first virtual plane where the first virtual object is located, and a second virtual plane having a height difference from the first virtual plane satisfying a preset height difference threshold.

In the example of the disclosure, in response to determining that a plurality of real planes are detected in the real space, a height difference between displayed planes may be computed, and then a plane having a height difference satisfying a preset height difference threshold is taken as the reference plane, to construct a virtual plane corresponding to each reference plane.

The first virtual plane where the first virtual object is located may be taken as a reference virtual plane, and a plane having a height difference from the first virtual plane satisfying the preset height difference threshold may be taken as the second virtual plane.

Alternatively, game operation buttons are displayed in the game operation interface, and the step that third projection data is generated in response to a first operation on any virtual object by performing preset animation rendering corresponding to the first operation on the operated virtual object in the target AR glasses display mode includes: the third projection data is generated in response to a first operation on the game operation button on the game operation interface by performing a preset animation rendering corresponding to the first operation on the virtual object corresponding to the first operation in the game display mode.

Illustratively, in the game display mode, as for the first operation, for instance, a jump or acceleration, on the game operation button by the user on the terminal device, the terminal device may perform jump animation rendering or acceleration animation rendering on the first virtual object. Then the game can be played based on the operation on the terminal device and the animation seen in the AR glasses by the user. Illustratively, through the game operation on the terminal device, the user defeats the monster and opens the chest in the second virtual object, and can obtain a corresponding pass-through key fragment, thus completing the game.

Alternatively, a game operation guide of stretching out a hand is displayed in the game operation interface, and the step, in which the third projection data is generated in response to a first operation on any virtual object by performing preset animation rendering corresponding to the first operation on the operated virtual object in the target AR glasses display mode, includes: in the example of the disclosure, the game operation guide of stretching out a hand in a text, animation, etc., mode may be displayed on the screen of the terminal device. Then, it is detected whether a corresponding stretching operation satisfying the game operation guide of stretching out a hand is present through the AR glasses in real time.

For instance, the game operation guide of stretching out a hand on the terminal device may be displayed as "palm up and hand open" for text, and one palm faces up and the hand opens for animation, and the AR glasses are projected and displayed that one palm faces up and the hand opens in the AR glasses. Further, screen information is continuously collected within the field of view of the AR glasses.

The screen information sent from the AR glasses is received in the game display mode.

In response to determining that the screen information represents the presence of an operation of stretching out a hand corresponding to the game operation guide of stretching out a hand, the first virtual object is obtained by performing re-rendering at a palm position corresponding to the operation of stretching out the hand.

The AR glasses re-project and display, by sending fourth projection data including the re-rendered first virtual object to the AR glasses, the first virtual object on the screen of the AR glasses according to the fourth projection data.

The user follows the prompt that the palm faces upwards, fists, and then opens, and in this way, the user wearing the AR glasses can see that the first virtual object appears on the open palm, improving the game's interest.

The following steps are repeated: palm motion information sent from the AR glasses is received, and third projection data is generated by performing preset animation rendering corresponding to the first operation on the first virtual object projected and displayed at the palm position according to the first operation represented by the palm motion information.

The example will be described illustratively, when the first operation represented by the palm motion information is a user palm tilt, preset slide-down animation rendering corresponding to the palm tilt is executed on the first virtual object projected and displayed at the palm position, such that the user wearing the AR glasses can see that the first virtual object slides down from the palm and falls onto a plane or the ground below the palm.

Alternatively, step S13, in which the second projection data is generated in response to a selection of an AR glasses display mode by the terminal device according to the first pose information and model data corresponding to the target AR glasses display mode in a selected target AR glasses display mode, includes: generating second projection data is in response to determining that the selected target AR glasses display mode is the model display mode according to the first pose information and model data corresponding to the model display mode.

Alternatively, the step, in which the third projection data is generated in response to a first operation on any virtual object by performing preset animation rendering corresponding to the first operation on the operated virtual object in the target AR glasses display mode, includes: screen information sent from the AR glasses is received in the model display mode.

In response to determining that a palm motion represented by the screen information satisfies the first operation of preset model operation motions, the method includes performing preset animation rendering corresponding to the first operation on the second virtual object, where the preset model operation motions correspond one-to-one to preset animations.

The example will be described illustratively, when a virtual glasses model is projected and displayed directly above the first virtual object, that is, the second virtual object is the virtual glasses model, a gesture interaction method is used. For instance, when the user performs a disassembling action, a moving action, and an assembling action on the virtual glasses model, a preset animation rendering corresponding to the disassembling action, the moving action, and the assembling action is performed on the virtual glasses model.

Illustratively, in response to determining that a forefinger tip of the user touches the virtual glasses model, an explosion unfolding operation is performed on the virtual glasses model, such that a process of explosion unfolding of the virtual glasses model and a three-dimensional explosion map after explosion unfolding are projected on the screen of the AR glasses, such that the user may conveniently view details of internal parts of the virtual glasses model. The user can grasp the exploded parts with gestures, and then move and zoom on the projected and displayed grasped parts, such that the internal details of the model can be freely viewed in the virtual space.

Alternatively, before the step where the first projection data is generated by performing rendering according to first pose information of a target object relative to a user wearing AR glasses and pre-stored model data of the target object, the method includes: AR object information sent from the AR glasses is received, where the AR object information carries the first pose information and object attribute information of the target object; and the model data of the target object is determined from the pre-stored model data according to the object attribute information.

The AR object information is generated by the AR glasses through the following step, that the objects scanned by the AR glasses are identified when the AR glasses are worn.

In the example of the disclosure, the AR glasses may scan the real space within the field of view by means of the configured camera and may run an identification algorithm to perform object identification on an object scanned by the AR glasses.

The first pose information of the target object relative to the user wearing the AR glasses is determined in response to determining that an identification result represents the presence of the target object matching a preset object in the objects.

In the example of the disclosure, the AR glasses may collect a point cloud of the target object by means of a configured radar, to determine a distance between the target object and the user wearing the AR glasses according to three-dimensional coordinates of the point cloud, and determine a pose of the target object according to the image identification, to determine first pose information of the target object relative to the user wearing the AR glasses according to the distance and the pose.

The AR object information is generated according to the first pose information and the object attribute information of the target object.

In the example of the disclosure, the object attribute information is used to determine an appearance and shape of the target object during projecting and displaying, and generally, the terminal device determines the model data of the target object from the pre-stored model data according to the object attribute information.

It can be understood that the household appliance linkage display mode, the game display mode, and the model display mode in the examples of the disclosure may be superimposed over one another for projecting and displaying. For instance, a virtual light effect of a desk lamp is displayed in an explosion projection effect, such that an explosion projection glasses model is virtually illuminated.

Further provided in the examples of the disclosure is a method for an AR glasses interactive display, performed by AR glasses. The AR glasses are in communication with the terminal device according to any one of the foregoing examples. FIG. 3 is a flowchart of a method for an AR glasses interactive display on an AR glasses side according to an example. With reference to FIG. 3, the method includes the following steps, S31 and S32.

In step S31, first projection data sent from the terminal device is received, where the first projection data is generated according to first pose information of a target object relative to a user wearing the AR glasses and pre-stored model data of the target object.

In step S32, a first virtual animation is projected and displayed on a screen of the AR glasses according to the first projection data, the first virtual animation including a first virtual object corresponding to the target object and an opening animation of the first virtual object, where an initial pose of the first virtual object, projected and displayed in a virtual space after the opening animation, relative to the user is related to the first pose information.

Alternatively, the method according to the example of the disclosure includes: second projection data sent from the terminal device is received, where the second projection data is generated in response to the selection of an AR glasses display mode by the terminal device according to the first pose information and model data corresponding to a game display mode in a selected target AR glasses display mode; and a second virtual animation is projected and displayed on the screen of the AR glasses according to the second projection data, where a second position of a second virtual object of the second virtual animation projected and displayed in the virtual space has a position correlation relation with a first position of the first virtual object projected and displayed in the virtual space.

Alternatively, the method according to the example of the disclosure includes: third projection data sent from the terminal device is received, where the third projection data is generated in response to a first operation on any virtual object by performing preset animation rendering corresponding to the first operation on the operated virtual object in the target AR glasses display mode; and a third virtual animation, corresponding to the third projection data, is projected and displayed on the screen of the AR glasses according to the third projection data.

Alternatively, before the step where the first projection data, sent from the terminal device, is received, the method includes: that the objects scanned by the AR glasses are identified when the AR glasses are worn.

The first pose information of the target object relative to the user wearing the AR glasses is determined in response to determining that an identification result represents the presence of the target object matching a preset object in the objects.

The AR object information is generated according to the first pose information and object attribute information of the target object.

The AR object information is sent to the terminal device.

The method steps executed on the AR glasses are described in detail in the examples on the terminal device side and will not be repeated here.

Further provided in the examples of the disclosure is an apparatus for an AR glasses interactive display, performed by a terminal device. The terminal device is in communication connection with AR glasses. With reference to FIG. 4, the apparatus 400 includes a rendering generation module 410 and a first sending module 420.

The rendering generation module 410 is configured to generate first projection data by performing rendering according to first pose information of a target object relative to a user wearing AR glasses and pre-stored model data of the target object.

The first sending module 420 is configured to project and display a first virtual animation on a screen of the AR glasses by the AR glasses according to the first projection data by sending the first projection data to the AR glasses, the first virtual animation including a first virtual object corresponding to the target object and an opening animation of the first virtual object, where an initial pose of the first virtual object, projected and displayed in a virtual space after the opening animation, relative to the user is related to the first pose information.

Alternatively, the rendering generation module 410 is further configured to generate, in response to selection of an AR glasses display mode by the terminal device, second projection data according to the first pose information and model data corresponding to the target AR glasses display mode in a selected target AR glasses display mode.

The first sending module 420 is further configured to project and display a second virtual animation on the screen of the AR glasses by the AR glasses according to the second projection data by sending the second projection data to the AR glasses, where a second position of a second virtual object of the second virtual animation projected and displayed in the virtual space has a position correlation relation with a first position of the first virtual object projected and displayed in the virtual space.

Alternatively, the rendering generation module 410 is further configured to generate, in response to a first operation on any virtual object, third projection data by performing preset animation rendering corresponding to the first operation on the operated virtual object in the target AR glasses display mode.

The first sending module 420 is further configured to project and display a third virtual animation corresponding to the third projection data on the screen of the AR glasses by the AR glasses according to the third projection data by sending the third projection data to the AR glasses.

Alternatively, the AR glasses display mode includes at least one of a household appliance linkage display mode, a game display mode, and a model display mode.

Alternatively, the rendering generation module 410 is further configured to: determine a target household appliance currently in communication connection with the terminal device in response to determining that the selected target AR glasses display mode is the household appliance linkage display mode; and generate the second projection data according to the second pose information of the target household appliance relative to the user wearing the AR glasses, model data corresponding to the target household appliance, and state information of the target household appliance, where the second virtual animation of the second projection data takes the target household appliance as the second virtual object.

Alternatively, the rendering generation module 410 is further configured to: determine, in response to the first operation on any virtual object, a preset control operation on the second virtual object according to the state information in the household appliance linkage display mode; determine an animation path of the first virtual object according to the first pose information and the second pose information; and generate the third projection data according to the animation path, where the third virtual animation of the third projection data shows that the first virtual object travels along the animation path to the position of the second virtual object in the virtual space, and executes the preset control operation on the second virtual object.

Alternatively, the apparatus 400 includes: an instruction generation module (not shown), such as a processor, configured to generate a control instruction aimed at the target household appliance according to the preset control operation corresponding to the state information; and a second sending module (not shown) configured to synchronously execute the preset control operation by the target household appliance by sending the control instruction to the target household appliance.

Alternatively, the apparatus 400 includes: an instruction reception module (not shown), such as an input/output device, configured to receive a twin instruction sent from the target household appliance, where the twin instruction is generated by the target household appliance in response to the control operation on the target household appliance; and a determination reception module (not shown), such as a processor, configured to determine a target control operation from the preset control operation according to the twin instruction.

The rendering generation module 410 is further configured to generate fifth projection data according to the target control operation.

The first sending module 420 is configured to project and display the control operation executed by the first virtual object on the second virtual object on the screen of the AR glasses by the AR glasses according to the fifth projection data by sending the fifth projection data to the AR glasses.

Alternatively, the rendering generation module 410 is further configured to: display a game operation interface on a screen of the terminal device in response to determining that the target AR glasses display mode is the game display mode; render corresponding game virtual objects in different virtual planes according to the first pose information and model data corresponding to the game display mode, where the virtual planes correspond one-to-one to real planes in a real space; and generate the second projection data according to the game virtual objects corresponding to the different virtual planes.

Alternatively, the rendering generation module 410 is further configured to: receive a plane detection result sent from the AR glasses, where the plane detection result includes a first virtual plane where the first virtual object is located, and a second virtual plane having a height difference from the first virtual plane satisfying a preset height difference threshold.

Alternatively, game operation buttons are displayed in the game operation interface, and the rendering generation module 410 is further configured to: generate, in response to a first operation on the game operation button on the game operation interface, the third projection data by performing preset animation rendering corresponding to the first operation on the virtual object corresponding to the first operation in the game display mode.

Alternatively, a game operation guide of stretching out a hand is displayed in the game operation interface, and the rendering generation module 410 is further configured to: receive screen information sent from the AR glasses in the game display mode; and obtain, in response to determining that the screen information represents the presence of an operation of stretching out a hand corresponding to the game operation guide of stretching out a hand, the first virtual object by performing re-rendering at a palm position corresponding to the operation of stretching out a hand.

The first sending module 420 is further configured to re-project and display, by sending fourth projection data including the re-rendered first virtual object to the AR glasses, the first virtual object on the screen of the AR glasses by the AR glasses according to fourth projection data.

The apparatus 400 includes an information reception module (not shown), such as an input/output device and/or processor, configured to receive palm motion information sent from the AR glasses, and generate third projection data by performing preset animation rendering corresponding to the first operation on the first virtual object projected and displayed at the palm position according to the first operation represented by the palm motion information.

Alternatively, the rendering generation module 410 is further configured to generate, in response to determining that the selected target AR glasses display mode is the model display mode, second projection data according to the first pose information, and model data corresponding to the model display mode.

Alternatively, the rendering generation module 410 is further configured to: receive screen information sent from the AR glasses in the model display mode; and perform, in response to determining that a palm motion represented by the screen information satisfies the first operation of preset model operation motions, preset animation rendering corresponding to the first operation on the second virtual object, where the preset model operation motions correspond one-to-one to preset animations.

Alternatively, the apparatus 400 includes a second reception module (not shown), such as an input/output device, configured to receive AR object information sent from the AR glasses before generating first projection data by performing rendering according to first pose information of a target object relative to a user wearing AR glasses and pre-stored model data of the target object, where the AR object information carries the first pose information and the object attribute information of the target object; and determine model data (not shown), such as a processor, of the target object from the pre-stored model data according to the object attribute information.

The AR object information is generated by the AR glasses through the following step: objects scanned by the AR glasses are identified when the AR glasses are worn.

The first pose information of the target object relative to the user wearing the AR glasses is determined in response to determining that an identification result represents the presence of the target object matching a preset object in the objects.

The AR object information is generated according to the first pose information and the object attribute information of the target object.

Further provided in the examples of the disclosure is an apparatus for an AR glasses interactive display, performed by AR glasses. The AR glasses are in communication with the terminal device according to the third aspect. With reference to FIG. 5, the apparatus 500 includes a first receiving module 510 and a projecting and displaying module 520.

The first receiving module 510 is configured to receive first projection data sent from the terminal device, where the first projection data is generated according to first pose information of a target object relative to a user wearing the AR glasses and pre-stored model data of the target object.

The projecting and displaying module 520 is configured to project and display a first virtual animation on a screen of the AR glasses according to the first projection data, the first virtual animation including a first virtual object corresponding to the target object and an opening animation of the first virtual object, where an initial pose of the first virtual object, projected and displayed in a virtual space after the opening animation, relative to the user is related to the first pose information.

Alternatively, the first receiving module 510 is further configured to receive second projection data sent from the terminal device, where the second projection data is generated in response to the selection of an AR glasses display mode by the terminal device according to the first pose information and model data corresponding to a game display mode in a selected target AR glasses display mode.

The projecting and displaying module 520 is further configured to project and display a second virtual animation on the screen of the AR glasses by the AR glasses according to the second projection data by sending the second projection data to the AR glasses, where a second position of a second virtual object of the second virtual animation projected and displayed in the virtual space has a position correlation relation with a first position of the first virtual object projected and displayed in the virtual space.

Alternatively, the first receiving module 510 is further configured to receive third projection data sent from the terminal device, where the third projection data is generated in response to a first operation on any virtual object by performing preset animation rendering corresponding to the first operation on the operated virtual object in the target AR glasses display mode.

The projecting and displaying module 520 is further configured to project and display a third virtual animation corresponding to the third projection data on the screen of the AR glasses according to the third projection data.

Alternatively, the apparatus 500 includes an information generation module (not shown), such as a processor, configured to identify objects scanned by the AR glasses when the AR glasses are worn before receiving the first projection data sent from the terminal device; determine the first pose information of the target object relative to the user wearing the AR glasses in response to determining that an identification result represents the presence of the target object matching a preset object in the objects; generate the AR object information according to the first pose information and object attribute information of the target object; and send the AR object information to the terminal device.

With respect to the apparatus in the above examples, specific ways in which the various modules execute operations have been described in detail in the examples relating to the method, and will not be described in detail here.

Further provided in the examples of the disclosure is an electronic device that includes a processor and a memory configured to store a processor executable instruction.

The processor is configured to implement the method for AR glasses interactive display according to any one of the foregoing examples by executing the executable instruction.

Further provided in the examples of the disclosure is a non-transitory computer-readable storage medium storing a computer program instruction. The program instruction implements the steps of the method for AR glasses interactive display according to any one of the foregoing examples when executed by a processor.

Figure 6:
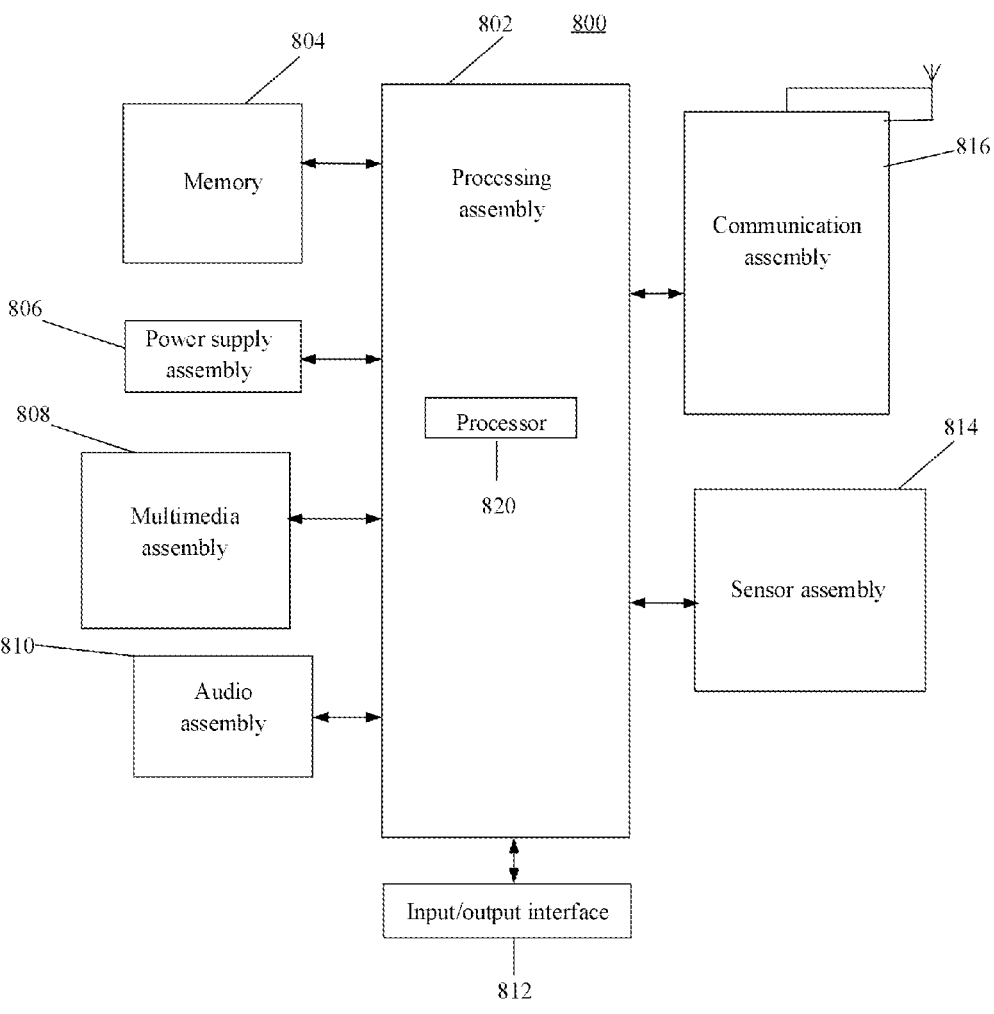
FIG. 6 is a block diagram of an electronic device for an AR glasses interactive display according to an example.

FIG. 6 is a block diagram of an electronic device for an AR glasses interactive display according to an example. For instance, the device 800 may be a mobile phone, a computer, a digital broadcast terminal, a messaging device, a gaming console, a tablet device, a medical device, a fitness device, a personal digital assistant, etc.

With reference to FIG. 6, the device 800 may include one or more of a processing assembly 802, a memory 804, a power supply assembly 806, a multimedia assembly 808, an audio assembly 810, an input/output interface 812, a sensor assembly 814, and a communication assembly 816.

The processing assembly 802 generally controls overall operation of the device 800, for instance, operations associated with display, phone calls, data communications, camera operations, and recording operations. The processing assembly 802 may include one or more processors 820 to execute an instruction to complete all or some of the steps of the method for AR glasses interactive display on a terminal device side. Moreover, the processing assembly 802 may include one or more modules to facilitate interaction between the processing assembly 802 and other assemblies. For instance, the processing assembly 802 may include the multimedia module to facilitate the interaction between the multimedia assembly 808 and the processing assembly 802.

The memory 804 is configured to store various types of data to support an operation on the device 800. Instances of such data include an instruction, operated on the device 800, for any application or method, contact data, phonebook data, messages, pictures, video, etc. The memory 804 may be implemented by any type of volatile or non-volatile memory apparatus, or their combinations, for instance, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply assembly 806 supplies power to the various assemblies of the device 800. The power supply assembly 806 may include a power management system, one or more power supplies, and other assemblies associated with power generating, managing, and distributing for the device 800.

The multimedia assembly 808 includes a screen that provides an output interface between the device 800 and the user. In some examples, the screen may include a liquid crystal display (LCD) and a touch panel (TP). In the case that the screen includes a touch panel, the screen may be implemented as a touch screen, so as to receive an input signal from a user. The touch panel includes one or more touch sensors to sense touches, slides, and gestures on the touch panel. The touch sensor may not only sense a boundary of a touch or slide action, but also detect duration and pressure related to the touch or slide operation. In some examples, the multimedia assembly 808 includes a front-facing camera and/or a rear-facing camera. When the device 800 is in an operational mode, for instance, a photographing mode or a video mode, the front-facing camera and/or the rear-facing camera may receive external multimedia data. Each of the front-facing and rear-facing cameras may be a fixed optical lens system or have a focal length and optical zoom capability.

The audio assembly 810 is configured to output and/or input audio signals. For instance, the audio assembly 810 includes a microphone (MIC) configured to receive an external audio signal when the device 800 is in the operational mode, for instance, a calling mode, a recording mode, and a speech identification mode. The received audio signal may be further stored in the memory 804 or transmitted via the communication assembly 816. In some examples, the audio assembly 810 further includes a speaker for outputting an audio signal.

The input/output interface 812 provides an interface between the processing assembly 802 and a peripheral interface module. The peripheral interface module may be a keyboard, a click wheel, a button, etc. These buttons may include, but are not limited to, a home button, a volume button, a start button, and a lock button.

The sensor assembly 814 includes one or more sensors for providing state assessments of various aspects for the apparatus 800. For instance, the sensor assembly 814 may detect an on/off state of the device 800 and the relative positioning of the assemblies. For instance, the assemblies are a display and a keypad of the device 800. The sensor assembly 814 may also detect a change in position of the device 800 or an assembly of the device 800, the presence or absence of contact between the user and the device 800, the orientation or acceleration/deceleration of the device 800, and temperature variation of the device 800. The sensor assembly 814 may include a proximity sensor configured to detect the presence of a nearby object in the absence of any physical contact. The sensor assembly 814 may also include a light sensor, for instance, a complementary metal oxide semiconductor (CMOS) or charge-coupled device (CCD) image sensor, for use in imaging applications. In some examples, the sensor assembly 814 may further include an acceleration sensor, a gyroscope sensor, a magnetic sensor, a pressure sensor, or a temperature sensor.

The communication assembly 816 is configured to facilitate communications between the device 800 and other devices in a wired or wireless mode. The device 800 may access a wireless network based on a communication standard, for instance, WiFi, 2G, or 3G, or their combinations. In an example, the communication assembly 816 receives a broadcast signal or broadcast-related information from an external broadcast management system by means of a broadcast channel. In one example, the communication assembly 816 also includes a near field communication (NFC) module to facilitate short-range communication. For instance, the NFC module may be implemented based on a radio frequency identification (RFID) technology, an infrared data association (IrDA) technology, an ultra-wide band (UWB) technology, a Bluetooth (BT) technology, or other technologies.

In the example, the device 800 may be implemented by one or more application specific integrated circuits (ASIC), a digital signal processor (DSP), a digital signal processing device (DSPD), a programmable logic device (PLD), a field programmable gate array (FPGA), a controller, a microcontroller, a microprocessor, or other electronic elements for executing the method for AR glasses interactive display on the terminal device side.

In the example, further provided is a non-transitory computer-readable storage medium including an instruction, for instance, a memory 804 including an instruction, and the instruction may be executed by the processor 820 of the apparatus 800 so as to execute the method for AR glasses interactive display on the terminal device side. For instance, the non-transitory computer-readable storage medium may be a read-only memory (ROM), a random access memory (RAM), a compact disc read-only memory (CD-ROM), a magnetic tape, a floppy disk, an optical data storage apparatus, etc.

Other examples of the disclosure will readily occur to those skilled in the art upon consideration of the specification and practical disclosure. The present application is intended to cover any variations, uses, or adaptations of the disclosure, and these variations, uses, or adaptations follow general principles of the disclosure and include common general knowledge or customary technical means in the technical field not disclosed in the disclosure. The description and examples are considered illustrative only, and the true scope and spirit of the disclosure are indicated by the following claims.

It is to be understood that the disclosure is not limited to the precise structure that has been described above and shown in the accompanying drawings, and that various modifications and changes may be made without departing from its scope. The scope of the disclosure is limited only by the appended claims.

What is claimed is:

1. A method for augmented reality (AR) glasses interactive display, performed by a terminal device, wherein the terminal device is in communication connection with AR glasses, and the method comprises:

generating first projection data by performing rendering according to first pose information of a target object relative to a user wearing AR glasses and pre-stored model data of the target object;

sending the first projection data to the AR glasses, wherein the first projection data is used to project and display a first virtual animation on a screen of the AR glasses by the AR glasses, the first virtual animation comprising a first virtual object corresponding to the target object and an opening animation of the first virtual object, wherein an initial pose of the first virtual object, projected and displayed in a virtual space after the opening animation, relative to the user is related to the first pose information;

generating, in response to selection of an AR glasses display mode by the terminal device, second projection data according to the first pose information and model data corresponding to the target AR glasses display mode in a selected target AR glasses display mode;

sending the second projection data to the AR glasses, wherein the second projection data is used to project and display a second virtual animation on the screen of the AR glasses by the AR glasses, wherein a second position of a second virtual object of the second virtual animation projected and displayed in the virtual space has a position correlation relation with a first position of the first virtual object projected and displayed in the virtual space;

generating, in response to a first operation on any virtual object, third projection data by performing preset animation rendering corresponding to the first operation on the operated virtual object in the target AR glasses display mode; and sending the third projection data to the AR glasses, wherein the third projection data is used to project and display a third virtual animation corresponding to the third projection data on the screen of the AR glasses by the AR glasses, and wherein the generating, in response to selection of an AR glasses display mode by the terminal device, second projection data according to the first pose information and model data corresponding to the target AR glasses display mode in a selected target AR glasses display mode comprises:

determining a target household appliance currently in communication connection with the terminal device in response to determining that the selected target AR glasses display mode is a household appliance linkage display mode; and generating the second projection data according to second pose information of the target household appliance relative to the user wearing the AR glasses, model data corresponding to the target household appliance and state information of the target household appliance, wherein the second virtual animation of the second projection data takes the target household appliance as the second virtual object.

2. The method according to claim 1, wherein the generating, in response to a first operation on any virtual object, third projection data by performing preset animation rendering corresponding to the first operation on the operated virtual object in the target AR glasses display mode comprises:

determining, in response to the first operation on any virtual object, a preset control operation on the second virtual object according to the state information in the household appliance linkage display mode;

determining an animation path of the first virtual object according to the first pose information and the second pose information; and generating the third projection data according to the animation path, wherein the third virtual animation of the third projection data shows that the first virtual object travels along the animation path to the position of the second virtual object in the virtual space, and executes the preset control operation on the second virtual object.

3. The method according to claim 2, comprising:

generating a control instruction aimed at the target household appliance according to the preset control operation corresponding to the state information; and sending the control instruction to the target household appliance, wherein the control instruction is used to synchronously execute the preset control operation by the target household appliance.

4. The method according to claim 3, comprising:

receiving a twin instruction sent from the target household appliance, wherein the twin instruction is generated by the target household appliance in response to the control operation on the target household appliance;

determining a target control operation from the preset control operation according to the twin instruction;

generating fifth projection data according to the target control operation; and sending the fifth projection data to the AR glasses, wherein the fifth projection data is used to project and display the control operation executed by the first virtual object on the second virtual object on the screen of the AR glasses by the AR glasses.

5. The method according to claim 1, wherein the generating, in response to selection of an AR glasses display mode by the terminal device, second projection data according to the first pose information and model data corresponding to the target AR glasses display mode in a selected target AR glasses display mode comprises:

displaying a game operation interface on a screen of the terminal device in response to determining that the target AR glasses display mode is a game display mode;

rendering corresponding game virtual objects in different virtual planes according to the first pose information and model data corresponding to the game display mode, wherein the virtual planes correspond one-to-one to real planes in a real space; and generating the second projection data according to the game virtual objects corresponding to the different virtual planes.

6. The method according to claim 5, wherein before the rendering corresponding game virtual objects in different virtual planes according to the first pose information and model data corresponding to the game display mode, the method comprises:

receiving a plane detection result sent from the AR glasses, wherein the plane detection result comprises a first virtual plane where the first virtual object is located, and a second virtual plane having a height difference from the first virtual plane satisfying a preset height difference threshold.

7. The method according to claim 5, wherein game operation buttons are displayed in the game operation interface, and the generating, in response to a first operation on any virtual object, third projection data by performing preset animation rendering corresponding to the first operation on the operated virtual object in the target AR glasses display mode comprises:

generating, in response to a first operation on a first game operation button on the game operation interface, the third projection data by performing preset animation rendering corresponding to the first operation on the virtual object corresponding to the first operation in the game display mode.

8. The method according to claim 5, wherein a game operation guide of stretching out a hand is displayed in the game operation interface, and the generating, in response to a first operation on any virtual object, third projection data by performing preset animation rendering corresponding to the first operation on the operated virtual object in the target AR glasses display mode comprises:

receiving screen information sent from the AR glasses in the game display mode;

in response to determining that the screen information represents presence of an operation of stretching out a hand corresponding to the game operation guide of stretching out a hand, obtaining the first virtual object by performing re-rendering at a palm position corresponding to the operation of stretching out a hand;

re-projecting and displaying, by sending fourth projection data comprising the re-rendered first virtual object to the AR glasses, the first virtual object on the screen of the AR glasses by the AR glasses according to the fourth projection data; and repeating: receiving palm motion information sent from the AR glasses, and generating third projection data by performing preset animation rendering corresponding to the first operation on the first virtual object projected and displayed at the palm position according to the first operation represented by the palm motion information.

9. The method according to claim 1, wherein the generating, in response to selection of an AR glasses display mode by the terminal device, second projection data according to the first pose information and model data corresponding to the target AR glasses display mode in a selected target AR glasses display mode comprises:

generating, in response to determining that the selected target AR glasses display mode is a model display mode, second projection data according to the first pose information and model data corresponding to the model display mode.

10. The method according to claim 9, wherein the generating, in response to a first operation on any virtual object, third projection data by performing preset animation rendering corresponding to the first operation on the operated virtual object in the target AR glasses display mode comprises:

receiving screen information sent from the AR glasses in the model display mode;

in response to determining that a palm motion represented by the screen information satisfies the first operation of preset model operation motions, performing preset animation rendering corresponding to the first operation on the second virtual object, wherein the preset model operation motions correspond one-to-one to preset animations.

11. The method according to claim 1, wherein before the generating first projection data by performing rendering according to first pose information of a target object relative to a user wearing AR glasses and pre-stored model data of the target object, the method comprises:

receiving AR object information sent from the AR glasses, wherein the AR object information carries the first pose information and object attribute information of the target object; and determining model data of the target object from the pre-stored model data according to the object attribute information, and wherein the AR object information is generated by the AR glasses, via:

identifying objects scanned by the AR glasses when the AR glasses are worn;

determining the first pose information of the target object relative to the user wearing the AR glasses in response to determining that an identification result represents the presence of the target object matching a preset object in the objects; and generating the AR object information according to the first pose information and the object attribute information of the target object.

12. A method for AR glasses interactive display, performed by AR glasses, wherein the AR glasses are in communication connection with a terminal device, and the method comprises:

receiving first projection data sent from the terminal device, wherein the first projection data is generated according to first pose information of a target object relative to a user wearing the AR glasses and pre-stored model data of the target object;

projecting and displaying a first virtual animation on a screen of the AR glasses according to the first projection data, the first virtual animation comprising a first virtual object corresponding to the target object and an opening animation of the first virtual object, wherein an initial pose of the first virtual object, projected and displayed in a virtual space after the opening animation, relative to the user is related to the first pose information;

receiving second projection data sent from the terminal device, wherein the second projection data is generated in response to selection of an AR glasses display mode by the terminal device according to the first pose information and model data corresponding to a game display mode in a selected target AR glasses display mode;

projecting and displaying a second virtual animation on the screen of the AR glasses according to the second projection data, wherein a second position of a second virtual object of the second virtual animation projected and displayed in the virtual space has a position correlation relation with a first position of the first virtual object projected and displayed in the virtual space;

receiving third projection data sent from the terminal device, wherein the third projection data is generated in response to a first operation on any virtual object by performing preset animation rendering corresponding to the first operation on the operated virtual object in the target AR glasses display mode; and projecting and displaying a third virtual animation corresponding to the third projection data on the screen of the AR glasses according to the third projection data, and wherein the terminal device generates the second projection data via:

determining a target household appliance currently in communication connection with the terminal device in response to determining that the selected target AR glasses display mode is a household appliance linkage display mode; and generating the second projection data according to second pose information of the target household appliance relative to the user wearing the AR glasses, model data corresponding to the target household appliance and state information of the target household appliance, wherein the second virtual animation of the second projection data takes the target household appliance as the second virtual object.

13. The method according to claim 12, wherein before the receiving first projection data sent from the terminal device, the method comprises:

identifying objects scanned by the AR glasses when the AR glasses are worn;

determining the first pose information of the target object relative to the user wearing the AR glasses in response to determining that an identification result represents the presence of the target object matching a preset object in the objects;

generating the AR object information according to the first pose information and object attribute information of the target object; and sending the AR object information to the terminal device.

14. AR glasses, wherein the AR glasses are in communication connection with a terminal device, comprising:

a processor and a memory for storing executable instructions capable of running on the processor, wherein the processor is configured to:

receive first projection data sent from the terminal device, wherein the first projection data is generated according to first pose information of a target object relative to a user wearing the AR glasses and pre-stored model data of the target object;

project and display a first virtual animation on a screen of the AR glasses according to the first projection data, the first virtual animation comprising a first virtual object corresponding to the target object and an opening animation of the first virtual object, wherein an initial pose of the first virtual object, projected and displayed in a virtual space after the opening animation, relative to the user is related to the first pose information;

receive second projection data sent from the terminal device, wherein the second projection data is generated in response to selection of an AR glasses display mode by the terminal device according to the first pose information and model data corresponding to a game display mode in a selected target AR glasses display mode;

project and display a second virtual animation on the screen of the AR glasses according to the second projection data, wherein a second position of a second virtual object of the second virtual animation projected and displayed in the virtual space has a position correlation relation with a first position of the first virtual object projected and displayed in the virtual space;

receive third projection data sent from the terminal device, wherein the third projection data is generated in response to a first operation on any virtual object by performing preset animation rendering corresponding to the first operation on the operated virtual object in the target AR glasses display mode; and project and display a third virtual animation corresponding to the third projection data on the screen of the AR glasses according to the third projection data, and wherein the terminal device generates the second projection data via:

determining a target household appliance currently in communication connection with the terminal device in response to determining that the selected target AR glasses display mode is a household appliance linkage display mode; and generating the second projection data according to second pose information of the target household appliance relative to the user wearing the AR glasses, model data corresponding to the target household appliance and state information of the target household appliance, wherein the second virtual animation of the second projection data takes the target household appliance as the second virtual object.

* * * * *